United States Patent [19]

Nakaniwa

[11] Patent Number: 5,276,625

[45] Date of Patent: Jan. 4, 1994

[54] SYSTEM FOR DETECTING AND ADJUSTING FOR VARIATION IN CYLINDER PRESSURE IN INTERNAL COMBUSTION ENGINE

[75] Inventor: Shinpei Nakaniwa, Gunma, Japan

[73] Assignee: Japan Electronic Control Systems Co., Ltd., Isezaki, Japan

[21] Appl. No.: 559,943

[22] Filed: Jul. 31, 1990

[30] Foreign Application Priority Data

Jul. 31, 1989 [JP] Japan .................. 1-196946

[51] Int. Cl.$^5$ .................. F02P 5/15; F02D 41/04
[52] U.S. Cl. .................. 364/431.08; 364/431.04; 123/425; 123/435
[58] Field of Search .................. 73/115, 117.3, 118.2; 364/558, 571.01, 571.02, 571.03, 571.04, 571.05, 571.06, 571.07, 571.08, 551.01, 431.01, 431.03, 431.04, 431.07, 431.08; 123/425, 435

[56] References Cited

U.S. PATENT DOCUMENTS

| | | | |
|---|---|---|---|
| 4,366,541 | 12/1982 | Mouri et al. | 364/571.04 X |
| 4,383,431 | 5/1983 | Gelernt | 364/571.04 X |
| 4,531,399 | 7/1985 | Aono | 73/115 X |
| 4,547,859 | 10/1985 | Wiggins | 364/571.05 |
| 4,556,030 | 12/1985 | Aono | 123/425 |
| 4,596,217 | 6/1986 | Bonitz et al. | 123/425 |
| 4,620,438 | 11/1986 | Howng | 73/35 |
| 4,660,435 | 4/1987 | Asano | 123/425 |
| 4,711,215 | 12/1987 | Cinpinski | 123/425 |
| 4,744,244 | 5/1988 | Tanaka | 73/115 |
| 4,760,733 | 8/1988 | Tanaka | 73/35 |
| 4,767,960 | 8/1988 | Strobel | 310/338 |
| 4,781,059 | 11/1988 | Suzuki et al. | 73/117.3 |
| 4,817,022 | 3/1989 | Jornod et al. | 364/571.03 |
| 4,944,271 | 7/1990 | Iwata et al. | 123/425 X |

FOREIGN PATENT DOCUMENTS

| | | |
|---|---|---|
| 0145480 | 6/1985 | European Pat. Off. |
| 0399069 | 11/1990 | European Pat. Off. |
| 3641114 | 6/1987 | Fed. Rep. of Germany |
| 5154 | 3/1966 | Japan |

OTHER PUBLICATIONS

M. Kondo et al., "Indiscope-A New Combustion Pressure Indicator with Washer Transducer", *Society of Automotive Engineers*, Automotive Engineering Meeting, Detroit, Mich., Oct. 13–17, 1975.

*Primary Examiner*—Vincent N. Trans
*Attorney, Agent, or Firm*—Foley & Lardner

[57] ABSTRACT

A cylinder pressure detecting system includes a plurality of pressure sensors, each of which is provided for monitoring pressure in one of plurality of cylinders. The system performs data sampling of detection values produced by one of the pressure sensors corresponding to a cylinder in an intake stroke, and compares each of the sampled detection values and a predetermined reference minimum value to respectively set differences therebetween as offset correction values. These processes are performed for the respective cylinders. The detection values of the pressure sensors for the respective cylinders are corrected on the basis of the offset correction values so that the detection values detected by the respective pressure sensors coincide with each other.

6 Claims, 8 Drawing Sheets

SYSTEM FOR DETECTING AND ADJUSTING FOR VARIATION IN CYLINDER PRESSURE IN INTERNAL COMBUSTION ENGINE

BACKGROUND OF THE INVENTION

1. Field of the Invention

The present invention relates generally to a system for detecting cylinder pressure in internal combustion engines for automotive vehicles. More specifically, the invention relates to a cylinder pressure detecting system which can decrease variation of cylinder pressure detection values in respective cylinders.

2. Description of The Background Art

In order to diagnose or detect combustion conditions in an internal combustion engine, cylinder pressure is generally detected by means of a cylinder pressure detecting system. Such detection systems have been disclosed in Japanese Patent Second (examined) Publication (Tokko Sho.) No. 41-5154, SAE Technical Paper No. 750883 and so forth. The disclosed systems are designed to detect cylinder pressure on the basis of an output of a ring-shaped pressure sensor which is sandwiched between mounting surfaces of an ignition plug which engages a cylinder head.

On the basis of the detected cylinder pressures in respective cylinders, a misfire is determined for individual cylinders. In addition, mean effective pressures Pi for respective cylinders are calculated on the basis of the respective cylinder pressures. On the basis of surge torque detected from fluctuation of the mean effective pressures Pi, inadequate settings for ignition timing and EGR (exhaust gas recirculation) for respective cylinders are corrected. Furthermore, on the basis of the mean effective pressures Pi, fuel injection amounts for respective cylinders are corrected so as to decrease variation of air/fuel ratios for respective cylinders.

However, variations in output characteristics are often produced in pressure sensors used for cylinder pressure detecting systems when they are manufactured. In addition, variation may be caused due to incorrect clamping torque when the pressure sensor is sandwiched between the mounting eye surfaces of the ignition plug for mounting therebetween. As a result, variation in output level of the pressure sensor is often produced.

For these reasons, the absolute value of the cylinder pressure detected by pressure sensor can not be accurately measured. Therefore, there is a disadvantage in that it is difficult to obtain predetermined accuracy in a case where determination of misfire, surge torque control, fuel injection modification control and so forth must be performed using a cylinder pressure detecting system of the aforementioned type.

SUMMARY OF THE INVENTION

It is therefore a principal object of the present invention to eliminate the aforementioned disadvantage and to provide a system for detecting cylinder pressure in internal combustion engines, which system can correct variation in cylinder pressure detection values in respective cylinders.

It is another object of the present invention to provide a cylinder pressure detecting system which can correct detection values for respective pressure detecting means, each of which is provided for monitoring pressure in one of a plurality of cylinders.

It is further object of the present invention to provide a cylinder pressure detecting means which can not only correct a gradient of variation of detection values of the pressure detecting means relative to variation of cylinder pressure for the respective cylinders so as to cause the gradient for the respective pressure detecting means of the respective cylinders to coincide with each other, but also correct offset amounts of the detection values of the respective pressure detecting means so as to cause the detection values of the respective pressure detecting means to coincide with each other.

In order to accomplish the aforementioned and other objects, a cylinder pressure detecting system includes means for setting a difference between the detection value and the normal value as an offset correction value, and means for correcting pressure detected by the pressure detecting means for the respective cylinders, on the basis of the offset correction values set for the respective cylinders.

According to one aspect of the present invention, a system for detecting cylinder pressure for an internal combustion engine having a plurality of cylinders, comprises:

a plurality of pressure detecting means, each of which is provided for monitoring pressure in one of the cylinders, to produce a pressure indicative signal;

stroke detecting means for detecting a predetermined stroke in which cylinder pressure is minimum, for respective cylinders;

sampling means for performing data sampling of detection values produced by one of the pressure detecting means corresponding to a cylinder in which the predetermined stroke is detected, when the predetermined stroke is detected;

offset value setting means for setting a difference between the detection value sampled by the sampling means and a predetermined reference minimum value, as an offset correction value, for the respective cylinders; and first correction means for correcting the pressure values detected by the pressure detecting means for the respective cylinders, on the basis of the offset correction values set for the respective cylinders, and for outputting the corrected pressure value.

The offset value setting means may set the offset correction value on the basis of a difference between output voltage of the pressure detecting means and zero voltage. Preferably, the predetermined stroke is an intake stroke, and the pressure detecting means is a pressure sensor. The system may further includes second second correction means for correcting a gradient of variation of the detection values of the respective pressure detecting means relative to variation of cylinder pressure for respective cylinders so as to cause the gradient for the respective pressure detecting means of the respective cylinders to coincide with each other.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention to a specific embodiment, but are for explanation and understanding only.

In the drawings.

DESCRIPTION OF THE PREFERRED EMBODIMENT

Figure 1:
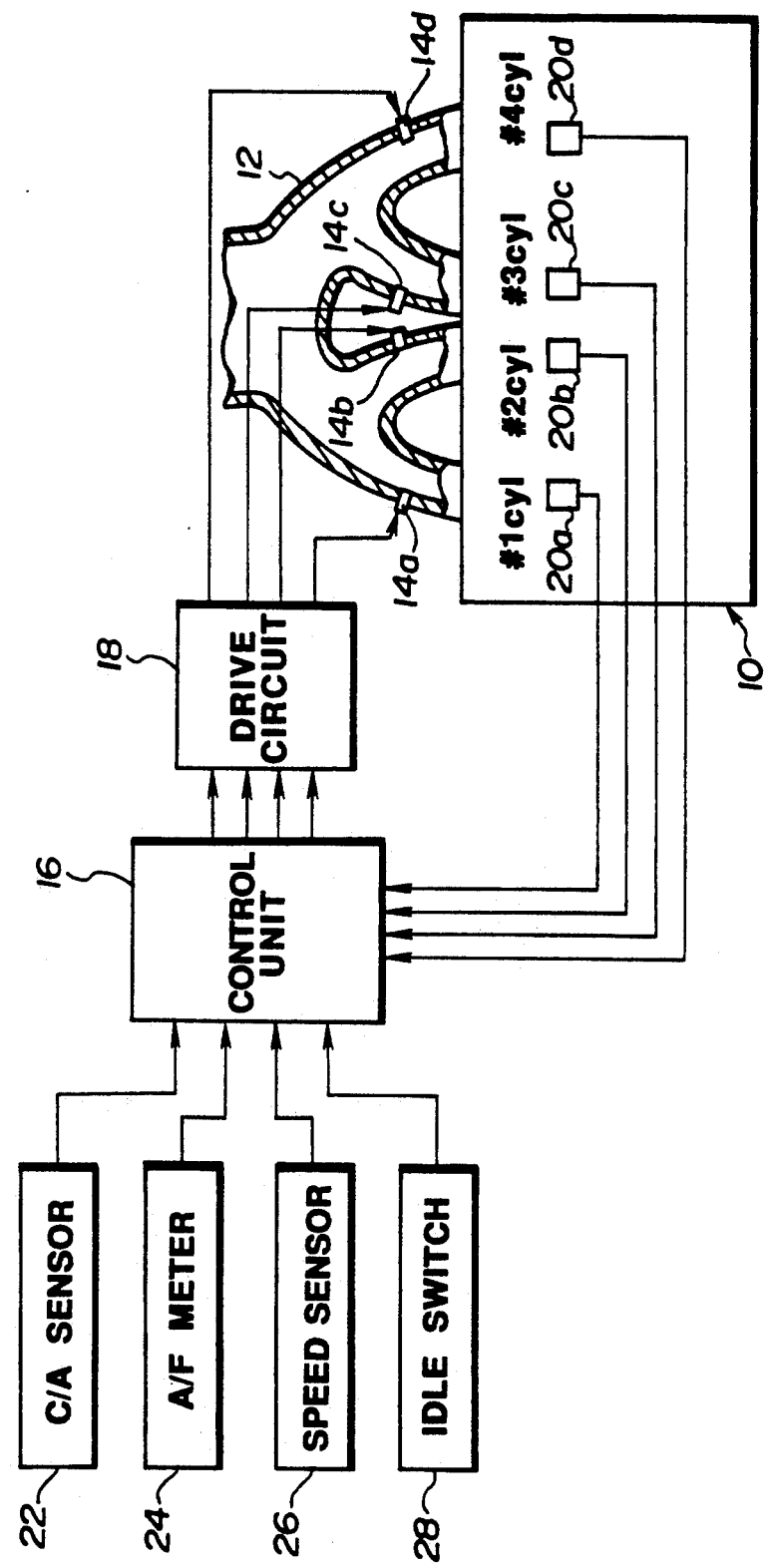
FIG. 1 is a schematic view of a cylinder pressure detecting means, according to the present invention.

Referring now to the drawings, particularly to FIG. 1, a four-cylinder internal combustion engine 10 has an intake manifold 12 which has four branch portions. The branch portions of the intake manifold 12 have electromagnetic fuel injection valves 14a, 14b, 14c and 14d, respectively. These fuel injection valves 14a to 14d are controlled in response to pulse signals output from a control unit 16 having a microcomputer therein, through a drive circuit 18, such that fuel is injected into respective cylinders.

The respective cylinders of the internal combustion engine 10 have pressure sensors 20a, 20b, 20c and 20d serving as a cylinder pressure detecting means. For example, the pressure sensors 20a to 20d may be clamped between mounting surfaces of an ignition plug provided in each cylinder. The pressure sensors 20a to 20d produce detection signals (voltage signals) in accordance with the cylinder pressure in the respective cylinders. The detection signals output from the pressure sensors 20a to 20d are input into a control unit 16.

The control unit 16 is electrically connected to various other sensors, such as a crank angle sensor 22, an air flow meter 24, a vehicular speed sensor 26 and an idle switch 28.

The crank angle sensor 22 serves to monitor the angular position of a crankshaft to produce a crank angle reference signal REF at every predetermined angular position, e.g. at every 70° BTDC (before top-dead-center) position, of the crankshaft, and a crank position signal POS at every given angular displacement, e.g. 1° or 2°. The crank angle sensor 22 is disposed within an engine accessory, such as a distributor, which rotates synchronously with engine revolution for monitoring the crankshaft angular position.

The air flow meter 24 serves to monitor an intake air flow rate representative of engine load to produce an intake air flow rate indicative signal Q.

The vehicular speed sensor 26 serves to monitor vehicular speed to produce a vehicular speed indicative signal.

The idle switch 28 is turned on when a throttle valve (not shown) which controls the intake air flow rate Q is positioned at a fully closed position (an idle position), to produce an idle position indicative signal.

The control unit 16 calculates a basic fuel injection amount Tp on the basis of the intake air flow rate Q and an engine speed N in accordance with the following equation:

$$Tp = K \times Q/N \text{ (K: constant)}$$

The engine speed N may be derived in the control unit 16 on the basis of one of the crank angle reference signal REF or the crank position angle POS in a known manner. As is well known, a fuel injection amount Ti is derived by correcting the basic fuel injection amount Tp in accordance with the operating conditions of the engine. Finally, the control unit 16 outputs pulse signals, each of which has a pulse width corresponding to the fuel injection amount Ti, to the respective fuel injection valves 14a to 14d via the drive circuit 18 at a predetermined timing in relation to the engine revolution cycle, so as to maintain the respective fuel injection valves 14a to 14d in a valve open position for a period corresponding to the fuel injection amount Ti. In this way, the control unit 16 may perform fuel injection control. In addition, the control unit 16 may determine cylinder pressure in the respective cylinders on the basis of outputs of the pressure sensors 20a to 20d to perform determination of misfire, ignition timing control and so forth for the respective cylinders.

Figure 2:
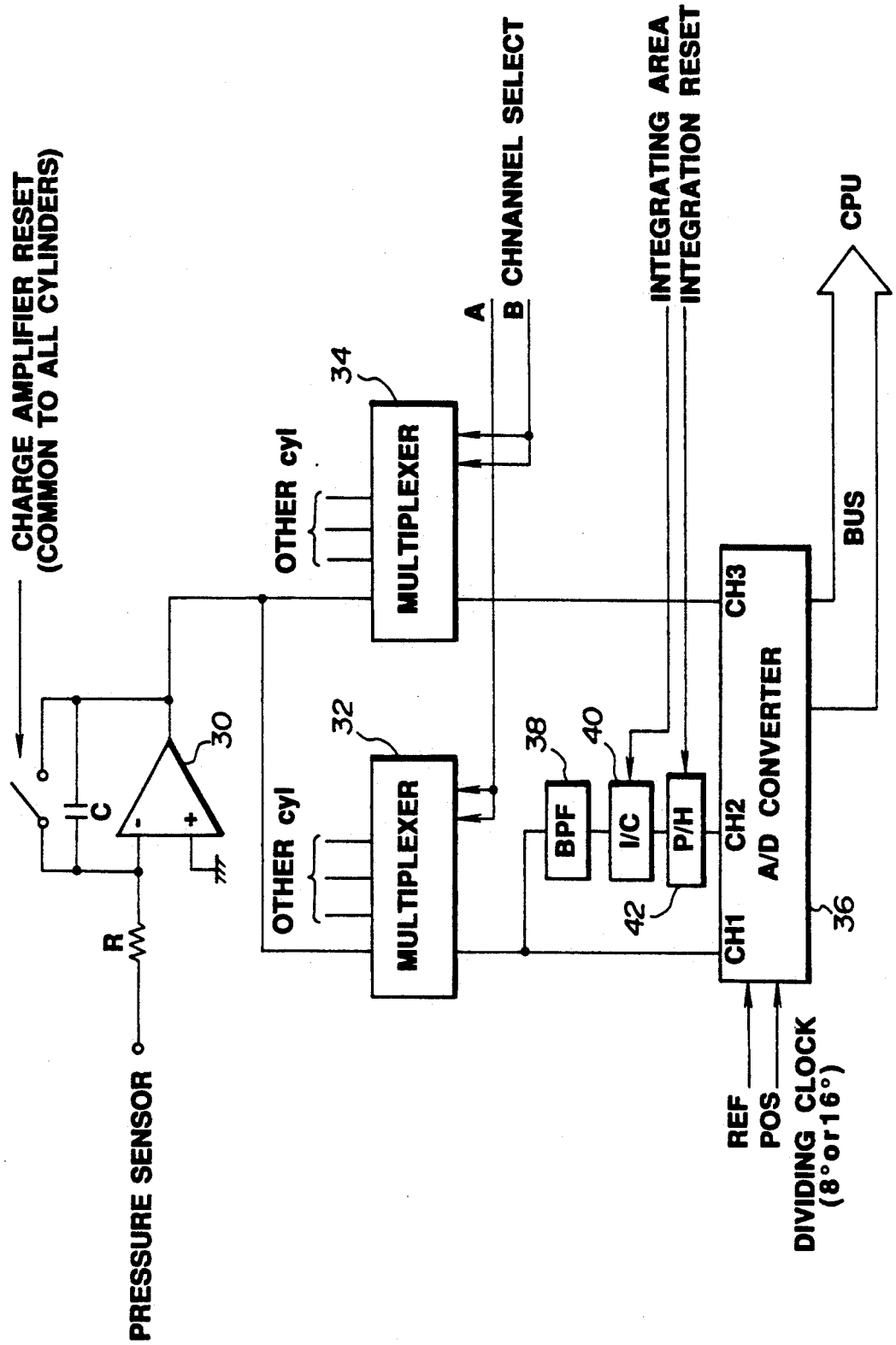
FIG. 2 is a block diagram of the cylinder pressure detecting means of FIG. 1.

FIG. 2 is a block diagram of the cylinder pressure detecting system according to the present invention, in which cylinder pressure detection is performed using the pressure sensors 20a to 20d.

Figure 3:
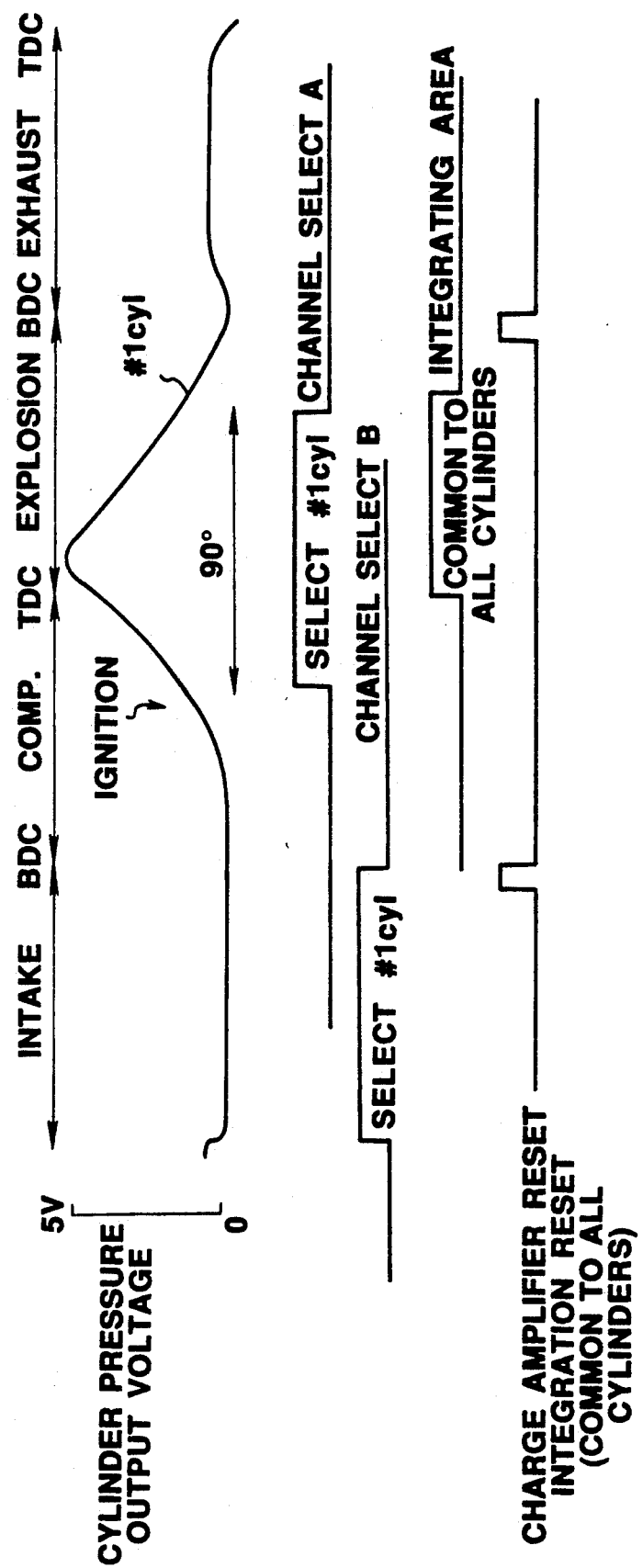
FIG. 3 is a time chart showing a relationship between various signal conditions and engine stroke.

The cylinder pressure detecting system has four charge amplifiers 30 which may be in the form of charge-to-voltage converters. The charge amplifiers 30 receive charge signals from the respective pressure sensors 20a to 20d and convert the charge signals into voltage signals corresponding to the pressures produced in the respective cylinders. The voltage signals converted by the respective charge amplifiers 30 are respectively divided into two segments to be respectively input to multiplexers 32 and 34. Each of the multiplexers 32 and 34 selectively output only one signal representative of the pressure value in a particular cylinder on the basis of channel select signals A and B output from a CPU of the microcomputer of the control unit 16. As shown in FIG. 3, the channel select signal A selects a cylinder which is performing a compression or explosion stroke, and the channel select signal B selects a cylinder which is performing an intake stroke, so that one signal representative of the pressure value in a selected cylinder can be output.

The signal selectively output from the multiplexer 32, i.e. the signal representative of the pressure value in a cylinder which is performing the compression or explosion stroke, is divided into two signals, one of which is directly input into an A/D converter 36 exclusively used for the pressure sensors 20a to 20d. The A/D converter 36 performs analog-to-digital conversion of the signal input thereto synchronously with a pulse signal produced at every predetermined fine angular position of the crankshaft, e.g. every 8° or 16°, which pulse signal is obtained by dividing the crank position signal POS, so that pressure information used for obtaining combustion pressure can be obtained at relatively fine crank angles. The other of the two signals from the pressure value indicative signal is input to a band-pass filter 38. An engine knocking component is determined from this signal by means of the band-pass filter 38. This knocking component is integrated over a predetermined area by means of an integrating circuit 40, and the integrated value is held in a peak holding circuit 42. The integrated value held in the peak holding circuit 42 is input into the A/D converter 36 by which analog-to-digital conversion of the integrated value of the knocking component is performed. The microcomputer of the control unit 16 compares this A/D conversion value with a predetermined slice level in a well known manner to determine whether or not engine knocking occurs.

On the other hand, the signal selectively output from the multiplexer 34, i.e. the signal representative of the pressure value in a cylinder which is performing the intake stroke, is directly input into the A/D converter 36, so that data sampling with respect to the cylinder pressure in the intake stroke can be performed. As shown in FIG. 3, the CPU of the microcomputer of the control unit 16 outputs reset signals which serve to direct the area to be integrated by the integrating circuit 40, to the charge amplifiers 30 and the peak holding circuit 42. As mentioned above, the CPU also outputs channel select signals A and B to the multiplexers 32 and 34.

The operation of the preferred embodiment of the cylinder pressure detecting system, according to the present invention, is described below.

The cylinder pressure detecting system performs cylinder pressure detection in accordance with programs shown in FIGS. 4 to 7.

Figure 4:
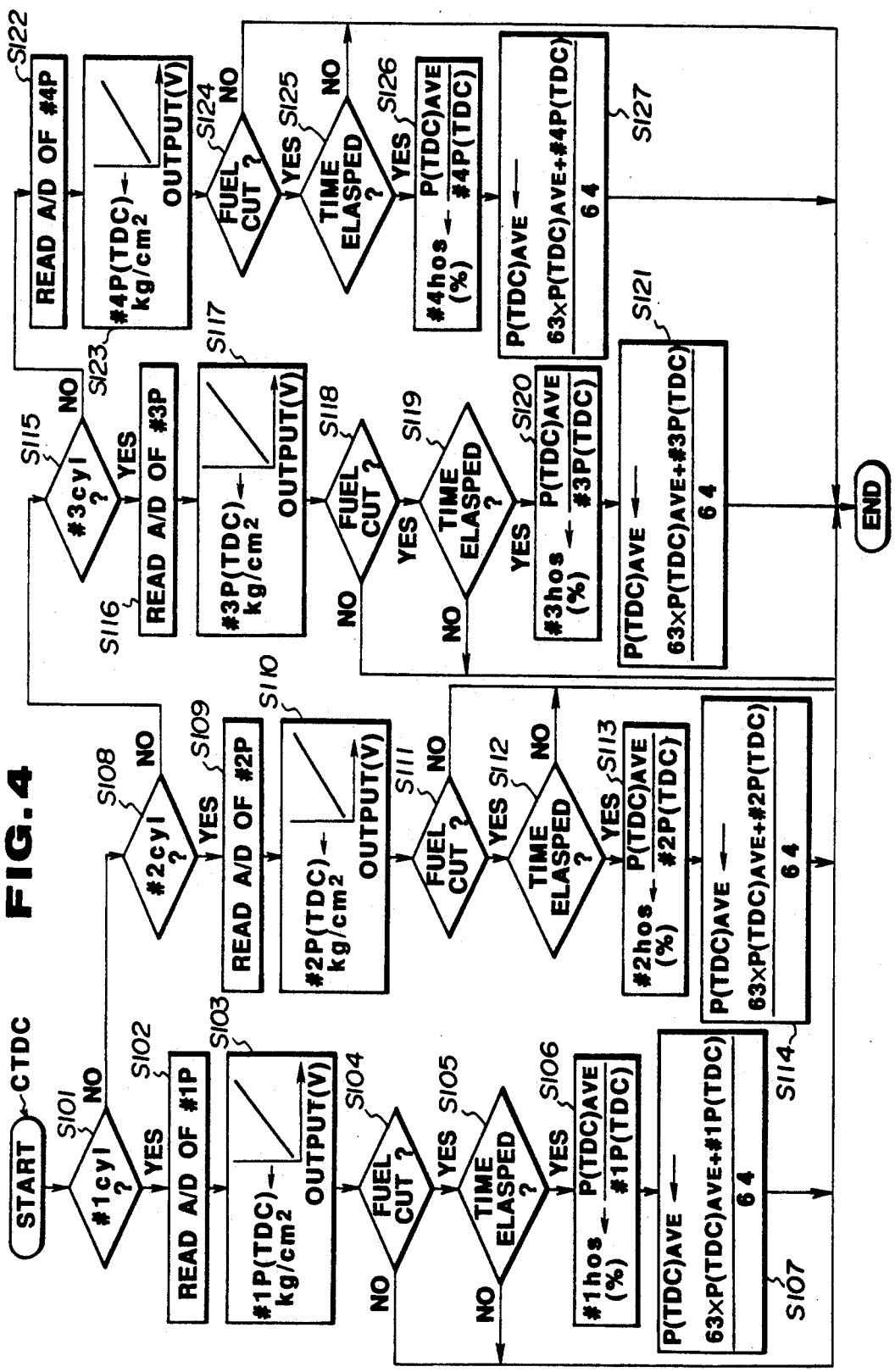
FIGS. 4 to 7 are flow charts of programs for correcting detection values for respective pressure sensors.

The program shown in FIG. 4 is executed at every CTDC (top-dead-center in compression stroke) position of the crankshaft for the respective cylinders, which CTDC may be detected by counting the crank position signal POS produced by the crank angle sensor 22 after the crank angle reference signal REF is produced by the sensor 22.

First of all, at step 101, it is determined whether or not the detected CTDC belongs to No.1 cylinder (#1 cylinder). For example, if one of four crank reference signal slits (not shown) formed in a rotary disc (not shown) is set to correspond to 70° BTDC of No.1 cylinder, it can be determined which of No.1, No.2, No.3 and No.4 cylinders (#1, #2, #3 and #4 cylinders) the detected CTDC belongs to, in a known manner.

When it is determined that the detected CTDC belongs to No.1 cylinder, the routine goes to step 102 in which the A/D conversion of the output signal of the pressure sensor 20a provided in No.1 cylinder is performed, and the A/D conversion value is read.

At step 103, on the basis of the output value of the pressure sensor 20a read at step 102, cylinder pressure #1P(TDC) at the CTDC in No.1 cylinder is derived from a map in which cylinder pressures corresponding to the outputs of the pressure sensor are preset.

At step 104, it is determined whether or not the engine is in a fuel cutting condition in which the fuel injection valves 14a to 14d temporarily stop fuel injection. The fuel cutting condition means, e.g. a predetermined deceleration condition. In this condition, fuel injection is stopped when all of three requirements are satisfied, i.e. the vehicular speed detected by the vehicular speed sensor 26 is less than a predetermined value, the idle switch 28 is ON and the engine speed N is greater than a predetermined value. In this condition, fuel consumption can be improved. Such fuel cutting is a well known art.

When it is determined that the engine is in the fuel cutting condition at step 104, the routine goes to step 105 in which it is determined whether or not a predetermined period of time has elapsed since the fuel injection was stopped. As will be described hereinafter, this determination is required in order to perform the data sampling of only a compression pressure produced by engine pumping effect in a condition in which no combustion pressure occurs while fuel injection is stopped. That is, the compression pressure can not be accurately measured immediately after fuel injection is stopped, since combustion pressure may still be produced by the combustion of fuel remaining in the cylinder.

If it is determined that the predetermined period of time has elapsed at step 105, it is presumed that no combustion pressure occurs in the cylinder. Therefore, the cylinder pressures at CTDC in the respective cylinders, i.e. the compression pressures of the respective cylinders, should be equal to each other. Accordingly, if the cylinder pressure at CTDC in No. 1 cylinder detected by the pressure sensor 20a deviates from the mean compression pressure of all cylinders, such deviation indicates a detection error of the pressure sensor 20a.

Figure 8:
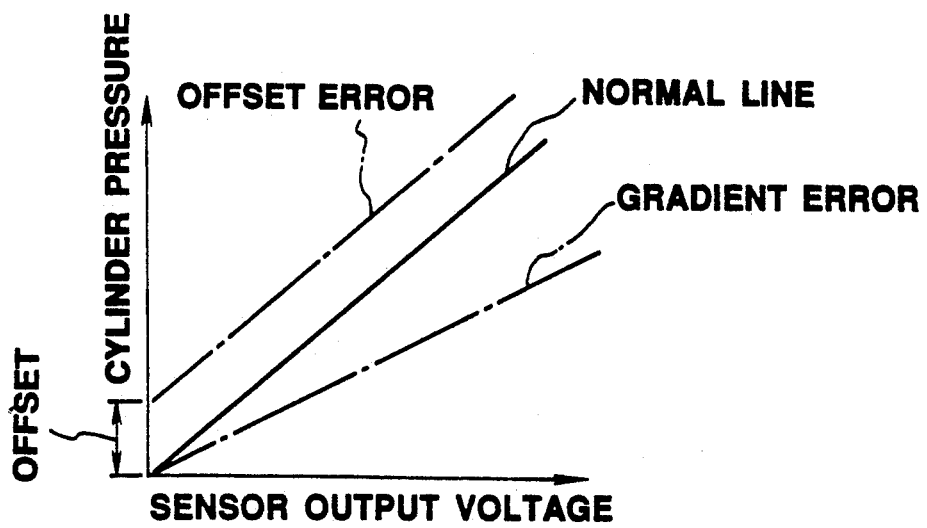
FIG. 8 is a graph showing a relationship between sensor output voltage and cylinder pressure.

When YES is determined at step 105, the routine goes to step 106 in which, in order to correct the detection value of the pressure sensor 20a of No. 1 cylinder to coincide with the detection level of the respective cylinders, the correction coefficient #1hos(%) is determined in accordance with the following equation:

$$\#1hos(\%) = \frac{P(TDC)_{AVE}}{\#1P(TDC)}$$

in which $P(TDC)_{AVE}$ is mean compression pressure of the respective cylinders which is obtained by determining the weighted mean of the cylinder pressures detected CTDC's of the respective cylinders. If the detection values of the pressure sensor 20a is multiplied by the correction coefficient #1hos(%), the compression pressure detected by the pressure sensor 20a can be corrected so as to approach the mean level of the respective cylinders. That is, the variation characteristics (gradient) of the output signals of the pressure sensors 20a to 20d relative to the variation of the cylinder pressure can be corrected so as to be essentially equal to each other for the respective cylinders, as shown in FIG. 8.

At step 107, a weighted mean of the current detected compression pressure #1P(TDC) and the preceding mean compression pressure $P(TDC)_{AVE}$ is derived in accordance with the following equation, and the result is used as a new mean compression pressure $P(TDC)_{AVE}$.

$$P(TDC)_{AVE} \leftarrow \frac{63 \times P(TDC)_{AVE} + \#1P(TDC)}{64}$$

On the other hand, when it is not determined that the detected CTDC belongs to No. 1 cylinder at step 101, the routine goes from step 101 to step 108 in which it is determined whether or not the detected CTDC belongs to No. 2 cylinder. When it belongs to No. 2 cylinder, a correction coefficient #2hos (%) for No. 2 cylinder is derived at steps 109 to 114 which are similar processes to steps 102 to 107.

When it is not determined that the detected CTDC belongs to No. 2 cylinder at step 108, the routine goes from step 108 to step 115 in which it is determined whether or not the detected CTDC belongs to No. 3 cylinder. When it belongs to No. 3 cylinder, a correction coefficient #3hog (%) for No. 3 cylinder is derived at steps 116 to 121 which are similar processes to steps 102 to 107.

In addition, when it is not determined that the detected CTDC belongs to No. 3 cylinder at step 115, the routine goes from step 115 to step 122. This means that the detected CTDC belongs No. 4 cylinder. In this case, a correction coefficient #4hos (%) for No. 4 cylinder is derived at steps 122 to 127 which are similar processes to steps 102 to 107.

If the detected values of the pressure sensors 20a to 20d are respectively multiplied by the aforementioned correction coefficients #1hos to #4 hos for the respective cylinders, the variation in gradients of variations of the detection values of the respective pressure sensors 20a to 20d relative to the variation of the corresponding cylinder pressure can be corrected. However, when variations of the detection values are offset from the normal variation, this offset can not sufficiently corrected.

Figure 5:
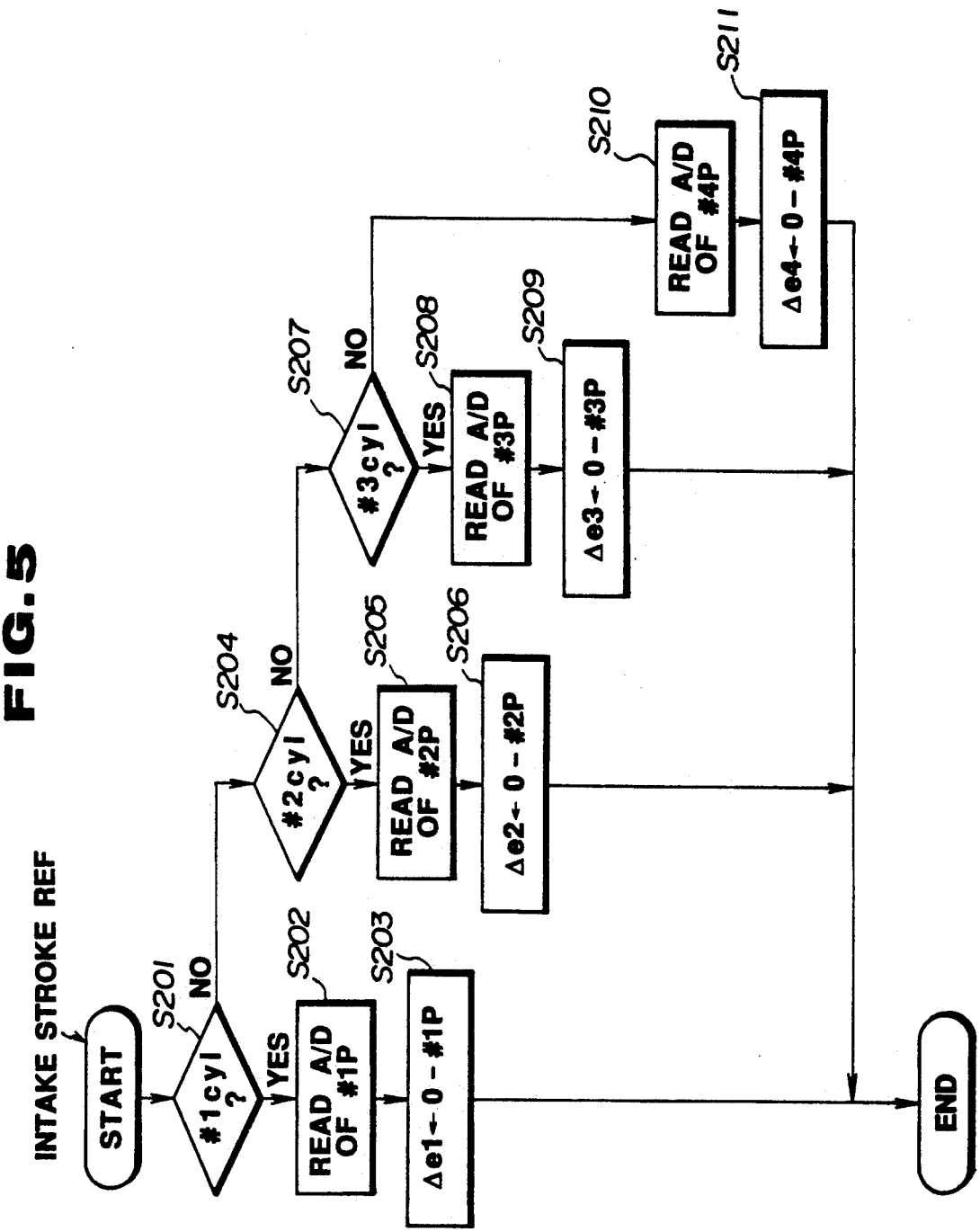

Therefore, according to the present invention, the offset amounts of the detected values of the respective pressure sensors 20a to 20d are detected, and correction values Δe corresponding to the respective offset amounts are set in accordance with the program of FIG. 5.

The program shown in FIG. 5 is executed when a crank angle reference signal REF is produced in the intake stroke for the respective cylinders. As shown in FIG. 3, since negative pressure is produced within a cylinder in its intake stroke, the output voltages of the pressure sensors 20a to 20d essentially coincide with a zero voltage corresponding to the minimum reference value if it is normal. Therefore, if there is a difference between the output voltage of the pressure sensor 20a, 20b, 20c or 20d and the zero voltage in the intake stroke, this difference corresponds to the offset amount.

First of all, at step 201, it is determined whether or not the detected intake stroke belongs to No. 1 cylinder. When No. 1 cylinder is in the intake stroke, the routine goes to step 202 in which the A/D conversion value of the output voltage of the pressure sensor 20a is read so that the cylinder pressure #1P for No. 1 cylinder is derived.

At step 203, an offset correction value Δe1 for No. 1 cylinder is derived in accordance with the following equation:

$$\Delta e1 \leftarrow 0 - \#1P$$

If the output value of the pressure sensor 20a for No. 1 cylinder is normal, the #1P should be zero while No. 1 cylinder is in the intake stroke. Therefore, since the #1P corresponds to the offset error, the correction value corresponding to 0−#1P may be added to the detection value of the pressure sensor in order to compensate for the offset error.

Similarly, offset correction values Δe2 to Δe4 are derived from the differences between the zero level and the respective detected cylinder pressures in the intake strokes for the respective cylinders, at steps 204 to 211.

Figure 6:
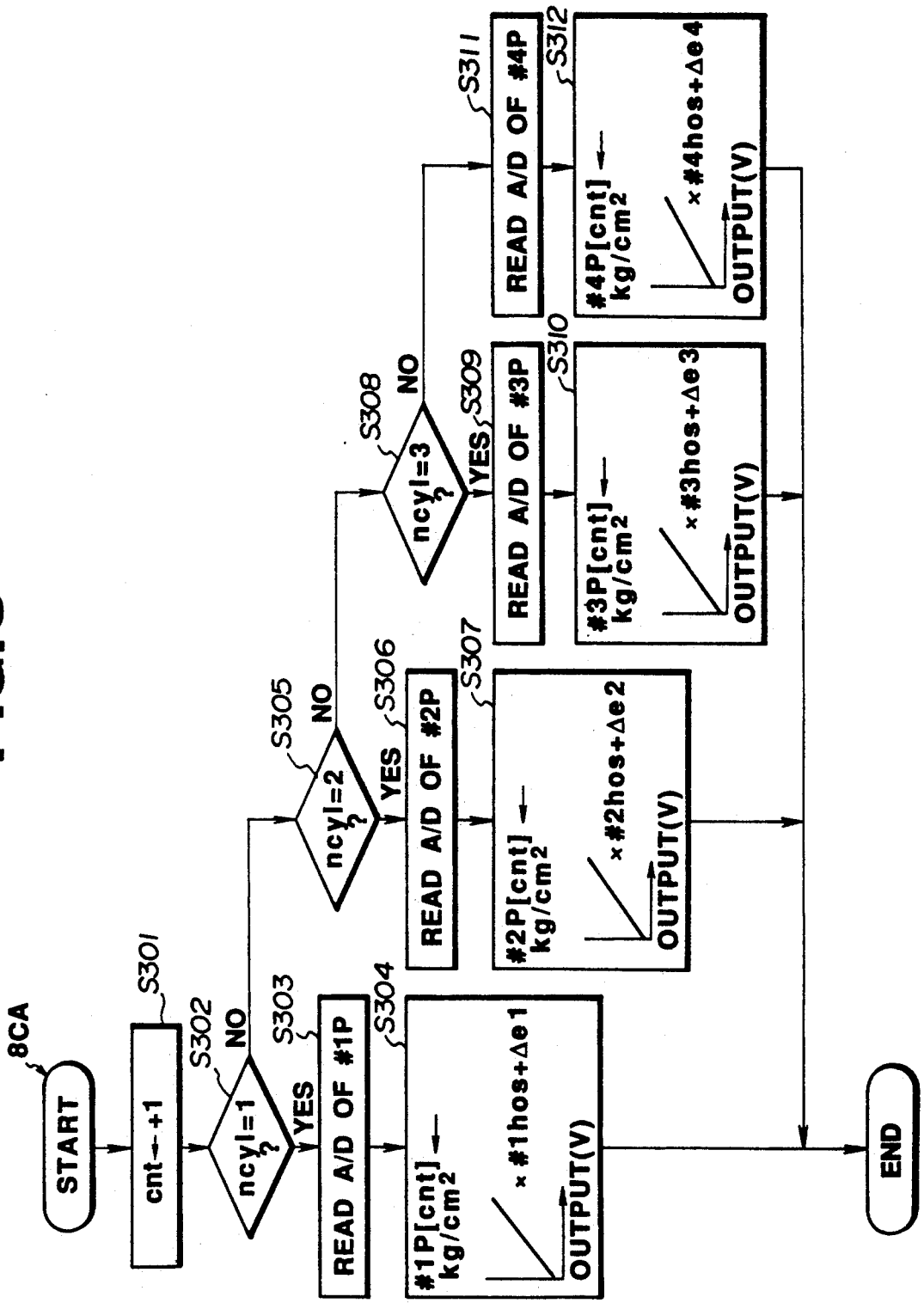

FIG. 6 shows a process for correcting the detected values of the respective pressure sensors 20a to 20d, by using the correction coefficients #1hos to #4hos and the offset correction values Δe1 to Δe4.

The program of FIG. 6 is executed at every predetermined fine crank angular position, e.g. every 8°, of the crankshaft, which angular position is detected on the basis of a signal produced from the crank angle sensor 22. According to this program, cylinder pressure data sampling for the respective cylinders are performed at every fine crank angle. As will be described hereinafter, this cylinder pressure data is used for deriving the mean effective pressure Pi in accordance with a program of FIG. 7.

At step 301, a counter value CNT is increased by 1. As will be described hereinafter, the counter value CNT is reset to zero at every output of the crank angle reference signal REF, i.e. at every 70° BTDC position of the crankshaft in accordance with the program of FIG. 7. At step 302, it is determined whether or not a cylinder discriminating value NCYL is 1.

As will be described hereinafter, this cylinder discriminating value NCYL is set in sequence at every output of the crank angle reference signal REF in accordance with the program of FIG. 7. When a crank angle reference signal REF corresponding to ignition timing of No. 1 cylinder is output, the cylinder discriminating value NCYL is set to be 1. Thereafter, it is held to be 1 until next crank angle reference signal REF corresponding to ignition timing of No. 3 cylinder is output. Therefore, while the cylinder discriminating value NCYL is 1, data sampling of combustion pressure in No. 1 cylinder can be preformed by inputting the detected value of the pressure sensor 20a for No. 1 cylinder.

When it is determined that the cylinder discriminating value NCYL is 1 at step 302, the routine goes to step 303 in which A/D conversion of the output of the pressure sensor 20a for No. 1 cylinder is performed, and the A/D conversion value is input. At step 304, this input value (output voltage) is converted to cylinder pressure kg/cm$^2$, and this conversion value is multiplied by the correction coefficient #1hos for No. 1 cylinder to correct the output of the pressure sensor 20a. In addition, the offset correction value Δe1 is added to the result so that the cylinder pressure #1P(cnt) for No. 1 cylinder can be accurately obtained. In this way, when the cylinder discriminating value NCYL is 1, the counter value CNT is increased by 1 at every predetermined fine crank angular position, i.e. every 8°, of the crankshaft, the sampling of the cylinder pressure #1P corrected by the correction coefficient #1hos and offsetting by the offset value Δe1 is performed, and the number of the sampling is counted as a counter value CNT.

Similarly, when the cylinder discriminating value NCYL is 2 or 3, the sampling of the cylinder pressures #2P(cnt) for No. 2 cylinder or #3P(cnt) for No. 3 cylinder is performed at steps 305 to 310. When the cylinder discriminating value NCYL is neither 1, 2 nor 3, the sampling of the cylinder pressure #4P(cnt) for No. 4 cylinder is performed at steps 311 and 312.

Figure 7:
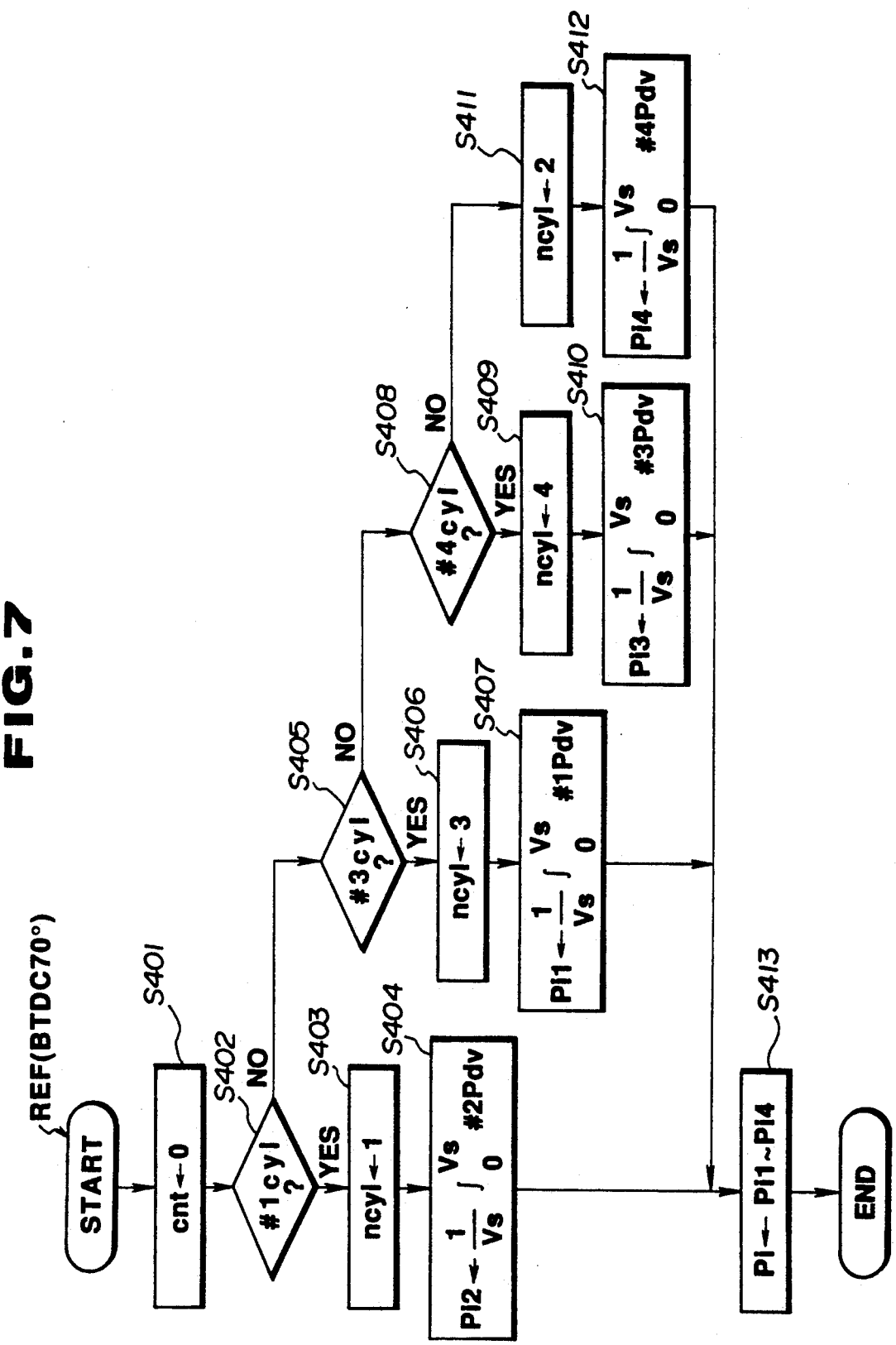

The program of FIG. 7 is executed at every output of a crank angle reference signal REF from the crank angle sensor 22. At step 401, the counter value CNT which is used for counting the number of samplings of the cylinder pressures #1P to #4P at every predetermined fine crank angle, is reset to zero. At step 402, it is determined whether or not the current crank angle reference signal REF corresponds to the ignition timing for No. 1 cylinder.

When it is determined that it corresponds to the ignition timing for NO. 1 cylinder, the routine goes to step 403 in which the cylinder discriminating value NCYL is set to be 1. Thereafter, the mean effective pressure Pi2 for No. 2 cylinder is derived at step 404. In a case where the current crank angle reference signal REF corresponds to the ignition timing for No. 1 cylinder, since the sampling of the cylinder pressure #2P in the No. 2 cylinder is performed immediately before the program of FIG. 7 is executed, the mean effective pressure Pi2 for No. 2 cylinder is derived on the basis of the sampling value of the cylinder pressure #2P at step 404.

After the mean effective pressure Pi2 is derived at step 404, the routine goes to step 413 in which the newest mean effective pressure Pi2 is set as the final mean effective pressure Pi.

Similarly, when it is determined that the current crank angle reference signal REF corresponds to the ignition timing for No. 3 cylinder at step 405, the cylinder discriminating value NCYL is set to be 3 at step 406, and then the mean effective pressure Pi1 for No. 1 cylinder is derived at step 407. This means effective pressure Pi1 is set as the final mean effective pressure Pi at step 413.

When it is determined that the current crank angle reference signal REF corresponds to the ignition timing for No. 4 cylinder at step 409, the cylinder discriminating value NCYL is set to be 4 at step 409, and then the mean effective pressure Pi3 for No. 3 cylinder is derived at step 410. This mean effective pressure Pi3 is set as the final mean effective pressure Pi at step 413.

When it is not determined that the current crank angle reference signal REF corresponds to the ignition timing for No. 4 cylinder at step 408, this means that it corresponds to the ignition timing for No. 2 cylinder. Therefore, the cylinder discriminating value NCYL is set to be 2 at step 411, and then the mean effective pressure Pi4 for No. 4 cylinder is derived at step 412. This mean effective pressure Pi4 is set as the final mean effective pressure Pi at step 413.

The mean effective pressure derived in the aforementioned manner can be used for the calculations of engine torque and surge torque which is a fluctuation of the engine torque. In addition, various controls, such as setting of ignition timing and EGR ratio control, can be performed in accordance with the surge torque.

In the embodiment shown, he detection value of the cylinder pressure is corrected by using both the correction coefficients #1hos to #4hos and the offset values Δe1 to Δe4. However, even if it is corrected using only the offset correction values Δe1 to Δe4, the detection accuracy still can be improved as to the offset error with significant reduction of variation in the detection values produced between the respective cylinders.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modification to the shown embodiments which can be embodied without departing from the principle of the invention as set forth in the append claims.

What is claimed is:

1. A system for determining cylinder pressure in a cylinder of an internal combustion engine, said cylinder performing an intake stroke under suction, said system comprising:

pressure detecting means for monitoring pressure in said cylinder and for producing an output signal indicative of said monitored pressure;

means for monitoring said internal combustion engine and for producing at least one reference signal at regular predetermined crankshaft angle intervals of the internal combustion engine;

means, responsive to said at least one reference signal, for detecting an occurrence of said intake stroke of said cylinder;

means for reading a first value of said output signal upon detection of said occurrence of said intake stroke of said cylinder and for storing said first value as a stored first detection value;

offset value setting means for setting a difference between said stored first detection value and a predetermined reference value as an offset correction value;

first correction means for reading a second value of said output signal at a predetermined crankshaft angular position, for storing said second value as a stored second detection value and for correcting said stored second detection value on the basis of said offset correction value for producing a corrected detection value;

means for sampling said corrected detection value to produce sampled corrected values and for processing said sampled corrected values for producing an output signal indicative of the cylinder; and control means for controlling ignition timing of the engine in response to said output signal.

2. An apparatus comprising:
(a) an internal combustion engine having a cylinder which, in operation, performs an intake stroke under suction, a compression stroke, an expansion stroke; and
(b) a control system for said internal combustion engine, responsive to cylinder pressure in said cylinder, said control system comprising
(i) means for monitoring said cylinder pressure in said cylinder and for producing a sensor output signal indicative of said cylinder pressure;
(ii) means for monitoring said internal combustion engine and producing at least one reference signal at regular predetermined crankshaft angle intervals of said internal combustion engine;
(iii) means responsive to said at least one reference signal for detecting an occurrence of said intake stroke of said cylinder;
(iv) means for reading a first value of said sensor output signal upon detection of an occurrence of said intake stroke of said cylinder and for storing said first value as a stored first detection value;
(v) means for setting a difference between said stored first detection value and a predetermined reference value as an offset correction value;
(vi) means for reading a second value of said sensor output signal at a predetermined crankshaft angular position, for storing said second value as a stored second detection value and for correcting said stored second detection value, on the basis of said offset correction value, for producing a corrected detection value;
(vii) means for sampling said corrected detection value for producing sampled correction values, for calculating an average of said sampled corrected values and for outputting said average as indicative of said cylinder pressure; and
(viii) control means for controlling ignition timing of said engine in response to said average.

3. An apparatus comprising:
(a) an internal combustion engine having a cylinder which, in operation, performs an intake stroke under suction, a compression stroke, an expansion stroke and an exhaust stroke;
(b) pressure sensor means for monitoring pressure in said cylinder and for producing a sensor output signal indicative of said pressure;
(c) crank angle sensor means for monitoring said internal combustion engine and producing at least one reference signal at regular predetermined crankshaft angle intervals of said internal combustion engine; and (d) a control unit operatively coupled with said internal combustion engine, said pressure sensor means and said crank angle sensor means, said control unit comprising (i) means responsive to said at least one reference signal for detecting said occurrence of said intake stroke of said cylinder;

(ii) means for reading a first value of said sensor output signal upon detection of said occurrence of said intake stroke of said cylinder and storing said first value as a stored first detection value;

(iii) means for setting a difference between said stored first detection value and a predetermined reference value as an offset correction value;

(iv) means for reading a second value of said sensor output signal at a predetermined crankshaft angular position, for storing said second value as a stored second detection value and for correcting said stored second detection value on the basis of said offset correction value for producing a corrected detection value;

(v) means for sampling said corrected detection value to produce sampled corrected values, for calculating an average of said sampled corrected values and for outputting said average as indicative) of said cylinder pressure; and (vi) control means for controlling ignition timing of said engine in response to said average.

4. A method of determining cylinder pressure in a cylinder of an internal combustion engine, the cylinder performing an intake stroke under suction, a compression stroke, an expansion stroke and an exhaust stroke, said method comprising the steps of:

monitoring pressure in said cylinder and producing a sensor output signal indicative of said pressure;

detecting an occurrence of said intake stroke of said cylinder;

reading a first value of said sensor output signal upon detection of said occurrence of said intake stroke of said cylinder and storing said first value as a stored first detection value;

setting a difference between said stored first detection value and a predetermined reference value as an offset correction value;

reading a second value of said sensor output signal at a predetermined crankshaft angular position and storing said second value as a stored second detection value;

correcting said stored second detection value, on the basis of said offset correction value for producing a corrected detection value;

sampling said correction detection value for producing sampled corrected detection values, calculating an average of said sampled corrected detection values and outputting said average as indicative of said cylinder pressure; and controlling ignition timing of the engine in response to said average.

5. A method of determining cylinder pressure in a cylinder of an internal combustion engine, said cylinder performing an intake stroke under suction, a compression stroke, an expansion stroke and an exhaust stroke, said method comprising the steps of:

monitoring pressure in said cylinder and producing a sensor output signal indicative of said monitored pressure;

detecting an occurrence of the intake stroke of the cylinder;

reading a first value of said sensor output signal upon detection of said occurrence of said intake stroke of said cylinder and storing said first value as a stored first detection value;

setting a difference between said stored first detection value and a predetermined reference value as an offset correction value;

reading a second value of said sensor output signal at a predetermined crankshaft angular position and storing said second value as a stored second detection value;

sampling said stored second detection value during a period of time, when no combustion takes place in said cylinder when the engine operates, for producing sampled second detection values;

calculating a weighted average of said sampled second detection values;

calculating a ratio of said weighted average to said stored second detection value outside of said period of time and updating a gradient correction coefficient with said ratio;

calculating a product of said stored second correction value and said gradient correction coefficient and a sum of said product and said offset correction value to produce a corrected detection value;

sampling said corrected detection value for sampled correction detection values and calculating an average of said sampled corrected detection values and outputting said average as indicative of said cylinder pressure; and controlling ignition timing of the engine in response to said average.

6. In an internal combustion engine having a plurality of cylinders, each of the plurality of cylinders performing an intake stroke, a compression stroke, an expansion stroke and an exhaust stroke, comprising:

a plurality of pressure sensors, corresponding in number to the plurality of cylinders, each of said pressure sensors mounted in one of the plurality of cylinders, respectively, each of said pressure sensors being constructed and arranged to produce, as a sensor signal, a voltage signal indicative of a positive cylinder pressure developed within a corresponding one of the plurality of cylinders, and producing a zero voltage signal in response to a negative cylinder pressure developed therewithin;

a crank angle sensor constructed and arranged to generate a crank angle reference signal (REF) at every predetermined angular position of a crankshaft in the engine and a crank position signal (POS) at every unit angular displacement of the crankshaft;

a first multiplexer operatively coupled with said plurality of pressure sensors;

a second multiplexer operatively coupled with said plurality of pressure sensors;

an analog-digital converter operatively coupled with said first and second multiplexers and with said crank angle sensor, said analog-digital converter being constructed and arranged to generate a digital signal indicative of a result of an analog to digital conversion at timings determined by said crank angle reference signal and said crank position signal; and a control unit operatively coupled with said analog-digital converter and said crank angle sensor, wherein said control unit comprises:

means for generating a first select signal to render said first multiplexer operable for supplying said analog-digital converter with the sensor signal of a specific one of said plurality of pressure sensors, which is mounted on one of the plurality of cylinders for performing compression and expansion strokes, and a second select signal to render said second multiplexer operable for supplying said analog-digital converter with the sensor output signal of a specific one of said plurality of pressure sensors which is mounted on one of the plurality of cylinders for performing an intake stroke;

means for storing said digital signal of said analog-digital converter at a timing determined by said crank angle reference signal, whenever each of the plurality of cylinders performs the intake stroke, as an offset correction value for a specific cylinder performing said intake stroke;

means for repeatedly storing said digital signal of said analog-digital converter at an interval determined by said crank position signal whenever each of the plurality of cylinders performs a compression stroke and an expansion stroke, as a set of sampled values for the cylinder performing said compression and expansion strokes;

means for converting said set of sampled values for the cylinder performing said compression and expansion strokes into a set of cylinder pressure values, correcting said set of cylinder pressure values with said correction value for the cylinder performing said compression and expansion strokes, and storing the result as a set of corrected cylinder pressure values for the cylinder performing said compression and expansion strokes;

means for processing said set of corrected cylinder pressure values for each of the plurality of cylinders and generating an output signal; and means for controlling the combustion in the plurality of cylinders in response to said output signal.

* * * * *